INVENTOR
EDWARD SCHWARTZ

BY Rene A. Kuypers

ATTORNEY

April 13, 1965 E. SCHWARTZ 3,178,693

MEMORY SYSTEM

Filed Dec. 31, 1962 2 Sheets-Sheet 2

United States Patent Office 3,178,693
Patented Apr. 13, 1965

3,178,693
MEMORY SYSTEM

Edward Schwartz, Philadelphia, Pa., assignor to Sperry Rand Corporation, New York, N.Y., a corporation of Delaware Filed Dec. 31, 1962, Ser. No. 248,350
15 Claims. (Cl. 340—174)

This invention relates to a thin film memory and in particular to an arrangement of the memory sense winding associated therewith.

A recognized disadvantage of known prior art thin film memory systems having a non-destructive or destructive readout has been that the amplitude of the bit transient signal induced in the sense winding by a "write" or "re-write" signal has interfered with the computer "read" function in a dual manner. Since prior art sense winding patterns have not been capable of limiting the amplitude of the transient signal in the sense line to the degree desired, the associated sense amplifier has tended to be driven into saturation. Therefore, the performance characteristics of these known thin film memories have been limited.

Secondly, the relatively large amplitude of the transient signal in the sense line has caused the cancellation of the bit transient to take place over a relatively long period of time. This factor has thereby limited the efficiency of such memory devices.

It is therefore an object of this invention to provide an improved sense winding pattern.

It is a further object of this invention to provide improved cancellation of the induced transient signal in the sense winding which is generated by a "write" or "re-write" signal.

It is a further object of this invention to provide a sense winding pattern that is simple to fabricate.

In accordance with a feature of this invention there is provided a thin film memory system which reduces the amplitude of the transient voltage induced in a sense line from a "write" pulse in a non-destructive memory and/or a "re-write" pulse in a destructive memory by the expedient of transposing (i.e, twisting) the sense line once per circuit board. The sense winding along a particular circuit board substrate is transposed by dividing both the top and bottom sense line overlays into first and second sections, respectively; thereafter, the first section of the top line overlay is interconnected through a perforation or partition in the substrate to the second section of the bottom line overlay and similarly, the second section of the top line overlay is interconnected to the first section of the bottom line overlay. There may be several circuit boards directly connected to one another with each providing a transposition of the sense line. The number of circuit boards directly connected to one another is dependent on the memory capacity and is a function of the design of the computer.

Each circuit board is divided into two areas by the sense winding transportation which normally occurs at the center position. The individual areas have a voltage induced therein as the "write" or "re-write" signal travels down the bit (i.e., write) line, in accordance with the normal operation of a non-destructive or destructive read-out memory system. Every time that there is a transposition of the sense winding, there is reversal of polarity of the induced voltage. Since the induced voltages are equally divided into positive and negative polarities by the transposition, effective reduction of the bit transient signal is obtained. Furthermore, since reduction in amplitude of the bit transient is achieved by the aforementioned expedient, there is no need to provide further transpositions between circuit boards and hence, they may be directly connected to one another by simple connector means.

In accordance with another feature of this invention the bit transient cancellation is achieved by transposing the sense winding after a first area and thereafter, transpositions are made after every two areas. The final transposition accommodates only one area.

Novel features that are considered characteristic of this invention are set forth with particularity in the appended claims. The invention itself, however, both as to its organization and method of operation, as well as additional objects and advantages thereof, will become apparent from the following description when considered in conjunction with the accompanying drawing, in which:

Figure 1:
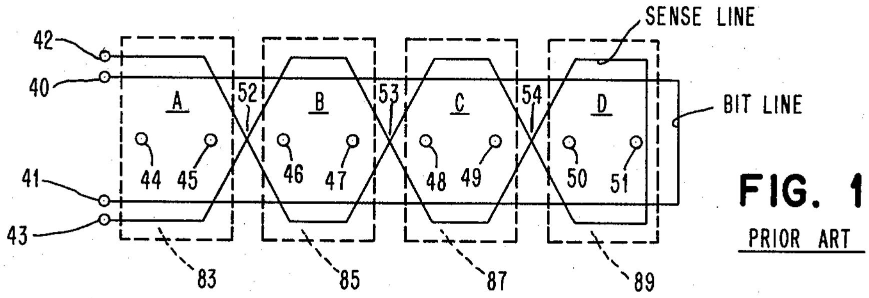
FIG. 1 PRIOR ART
FIGURE 1 is a schematic representation of a prior art sense winding pattern.

In carrying out the invention there are provided circuit boards having substrates, such as epoxy glass, and on top of which are arranged, in a line, spots of thin magnetizable film representing the bits of a binary word. Placed over the surfaces of the substrate is a narrow bit (i.e., write) line overlay by means of which a binary "0" or "1" may be written into the memory when energized by a bit line driver. Placed over the bit lines and in juxtaposition thereto are sense (i.e., read) line overlays, whose width dimension is narrower than the bit line overlay. The number of circuit boards connected to one another depends upon the size of the memory and, in most instances, there may be several directly connected to one another along a line. There is provided on each circuit board a transposition or physical twisting of the sense line by dividing both the top and bottom sense line overlays into first and second sections, respectively; thereafter, the first section of the top line overlay is interconnected through a perforation in the substrate to the second section of the bottom line overlay and similarly, the second section of the top line overlay is interconnected to the first section of the bottom line overlay. By transposing the sense line at approximately the center of each circuit board, each board may be considered as being divided into two sections or areas. The individual areas may incorporate several magnetizable spots and the number per area thereof is dependent upon the length of the circuit board. Whenever several circuit boards are directly connected to one another, it will be recognized that a transposition occurs after the first area of the first board, and subsequent transpositions occur after every two areas. The final transposition therefore accommodates only one area.

In accordance with a thin film memory system, single-turn solenoid drive coils are arranged transversely to the bit and sense line overlays. There are as many word solenoids as required by the word capacity of the memory.

In operation, the "read-driver" pulse for a certain word, which is selected by a diode matrix, for example, is applied via a word driver to the required word drive solenoid which is oriented perpendicular to the sense and bit lines, thereby rotating the magnetic vectors of the selected word from the "easy" axis toward the "hard" axis. A "read-out" signal of a selected memory word is detected by the sense line which is connected to the sense amplifier. As is understood in the operation of destructive read-out memory systems, the selected word that is "read-out" of the computer is demagnetized and the normal operation of the computer requires that the deleted word must be re-written into the same memory location immediately after the "read" function takes place. As a result, the "re-write" pulse is applied along the bit line by energizing the bit line driver after the "read" function. In a memory device of the non-destructive type, the magnetic vectors of the selected word rotate back to their original position after being rotated from the "easy" toward the "hard" axis by the "read-driver" pulse, and hence, no demagnetizing effect takes place. There is no demagnetizing effect in a non-destructive "read-out" since the magnetic vector is not rotated as far by the "read-driver" pulse. However, whenever it is necessary to change the orientation of the magnetic vector to correspond, for example, to a change from a "0" to a "1," a "write" signal must be applied to the bit or write line.

Since the sense winding is contiguous to the bit line, as the "write" signal in a non-destructive memory and/or a "re-write" signal in a destructive memory travels down the bit line, the inductive coupling between the sense and bit line causes a transient or spurious signal to be induced in the sense winding. The induced transient signal appears during the rise and fall time of the "write" or "re-write" pulse (i.e., when there is a change of voltage with respect to time). The induced transient signal in the sense line is undesirable in that it limits the speed of the memory operation because the transient must be cancelled or "die down" before the next "read-out" signal can be sent to the computer memory. Furthermore, unless there is cancellation or reduction in amplitude of the transient in the sense line, the sense amplifier connected thereto may become saturated (i.e., the transient amplitude is of such magnitude that it is beyond the range of the sense amplifier), and hence, will not perform properly.

As a result of the twisting of the sense lines on the circuit board, there is a change of polarity of the induced voltage in each area as the bit pulse travels down the bit line. The transpositions are arranged so that the "in-phase" and "out of phase" areas are equal (i.e., the sum of the positive areas are equal to the sum of the negative areas). Accordingly, in a four circuit board arrangement with one transposition per circuit board, there will be four negative and four positive voltages induced in the sense winding. Thus, as equal number of positive and negative induced voltages appear at the input terminals of the sense amplifier, the induced transient is effectively cancelled. Furthermore, since the sense winding pattern of the present invention provides that the beginning and end loops provided by the sense winding pattern covers one-half the area that the loops cover between the two extremes, this system provides improved cancellation of the bit transient.

In view of the simple manufacturing expedient of transposing the sense line once per circuit board, other boards whose number is determined by the size of the memory and having other films deposited thereon may be directly connected to one another along a line by a simple connector means.

Figure 2:
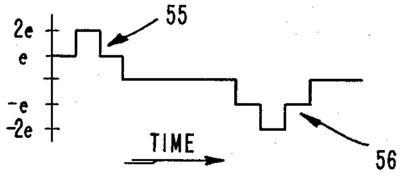
FIG. 2 PRIOR ART
FIGURE 2 is a graphical representation of the reduction of the bit transient in the embodiment shown in FIGURE 1.

In order to better understand the subject invention in relation to known prior art systems, FIGURES 1 and 2 have been included and will be accordingly discussed. FIGURE 1 is a schematic representation of a prior art thin film memory system incorporating, for the sake of simplicity, eight magnetized thin film spots 44 to 51. A bit (write) line 40, 41 is depicted in juxtaposition to the film spots and when energized by suitable means it orients the magnetic vectors of the thin film spots 44–51 to represent either binary "0" or "1." The sense (read) line 42, 43, is used to detect the orientation of the magnetic vector after a "read-out" pulse has been applied to the individual thin films by appropriate drive means. Whenever a pulse is applied to the bit line 40, 41, a bit transient signal is induced in the sense line 42 because of magnetic coupling therebetween. In order therefore to achieve proper operation of a thin film memory, it is necessary that the bit transient induced in the sense line 42 be of small value or cancelled. Cancellation of the bit transient is accomplished in FIGURE 1 by transposing or twisting the sense line winding at equal spaced positions shown at 52, 53 and 54. The transpositions divide the circuit boards 83, 85, 87 and 89 into four equal areas and the four areas are labeled from A to D. The effect of the transpositions 52, 53 and 54 is to reverse the polarity of the induced bit transient voltage. For example, the bit voltage induced in the sense line area A may be considered positive; however, because of the transposition at 52 the voltage induced in area B is negative. Similarly, the voltage induced in the sense line at area C is positive because of the transposition at 53 and the transposition at 54 makes the voltage induced in area D negative. As can be readily seen the four voltages induced in areas A to D are divided into two positive and two negative voltages because of the transpositions. As will be more fully explained later, it can be shown by referring to FIGURE 2 that the positive voltage 55 is effectively cancelled by the negative voltage 56 after the four induced voltages are added together. It should be noted, however, that because of the configuration of the sense winding shown in FIGURE 1, the amplitude of the total voltages are of a value $2e$ (in FIGURE 2). Furthermore, it should be noted that the cancellation of the positive and negative voltages occur over a relatively long period of time.

Figure 3:
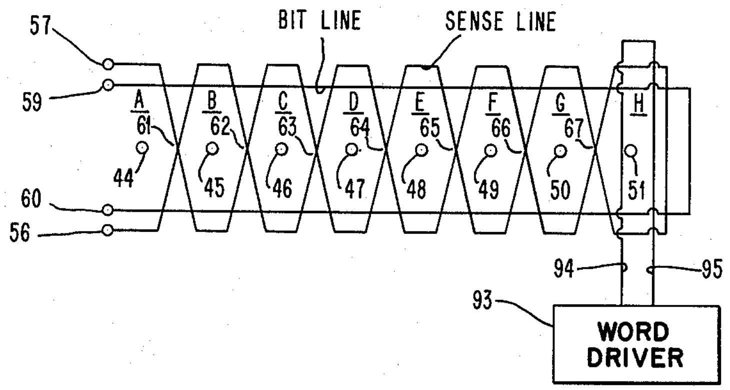
FIGURE 3 is a schematic representation of an improved sense winding pattern.
Figure 4:
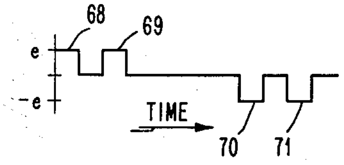
FIGURE 4 is a graphical representation of the reduction of the bit transient in the embodiment shown in FIGURE 3.

In order to improve upon the system shown in FIGURE 1, and reduce the amplitude of the transient signal by one-half, a system as shown in FIGURE 3 can be employed. As shown in FIGURE 3 it would be necessary to transpose the sense lines 56–57 (equivalents of lines 42–43 in FIGURE 1) after each individual thin film spot thereby doubling the transpositions. As depicted in FIGURE 3, each thin film spot 44 to 51 is followed by individual transpositions 61 to 67. By this system, there are developed four positive voltages induced in areas, A, C, E, G and four negative voltages induced in areas B, D, F and H for the same line length shown in FIGURE 1. Word driver 93 is shown connected to word drive lines 94 and 95 and is in juxtaposition to magnetizable spot 51. It is understood that each magnetized spot has read-drive lines similar to 94, 95 associated therewith. The word driver is employed in a thin film memory to energize the winding 94, 95 so as to rotate the magnetic vectors of the thin film spots from the "easy" to the "hard" axis. By referring to FIGURE 4 it can be shown that the distance between individual transpositions is equal to the distance of that between individual thin film spots and hence, the amplitude of the induced bit transient signal generated in the line of FIGURE 3 is one-half of that shown in FIGURE 1. However, a notable disadvantage is present in even such an improved system. That is, the doubling of the transpositions in FIGURE 3 over that in FIGURE 1 greatly enhances the manufacturing expense and difficulty. Accordingly, the embodiment depicted and explained in FIGURES 5 to 7 materially reduces the manufacturing difficulty and expense.

Figure 5:
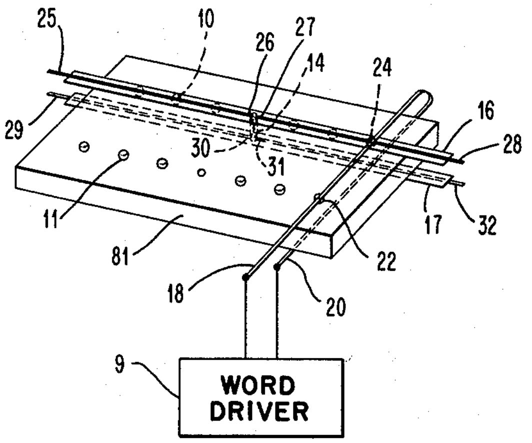
FIGURE 5 is an actual perspective drawing of a single circuit board substrate.

Referring now to FIGURE 5, there is provided a circuit board 81 which may be made of epoxy glass or similar substrate material on top of which is plated a thin film of several hundred angstroms thickness. Individual spots of the film such as 10 may be magnetized to represent the bits (i.e., binary 0's or 1's) of a binary word. As is understood, there may be several similar circuit boards directly connected to one another by an appropriate means. Placed over the thin films is a bit line overlay 16 approximately thirty mils wide. The bit line return 17 is oriented beneath the substrate. The sense line overlay, which is approximately ten mils wide is placed over the bit line overlay. The top sense line 8 is divided into a first section 25, 26 and a second section 27, 28; the sense line overlay beneath the substrate is divided into a first section 29, 30 and a second section 31, 32.

The section 25, 26 covers the top half section of the circuit board 81 whereupon, it is then connected to the second section 31, 32, of the sense line overlay beneath the substrate by way of the perforation 14. Similarly, the second section 27, 28, of the top sense line overlay is connected to the first section 29, 30, of the bottom line overlay. In this manner, a transposition or twisting of the sense line takes place on an individual circuit board. The circuit board arrangement consisting of plated thin films with sense and bit line overlays may be considered to be a type of module system (i.e., each module is a component of a computer memory system). It is understood that each circuit board substrate may provide additional rows or lines of magnetized spots such as 11 which is depicted without sense and bit lines, but for ease of understanding, the invention will be explained with reference to a single row of magnetized spots.

Figure 6:
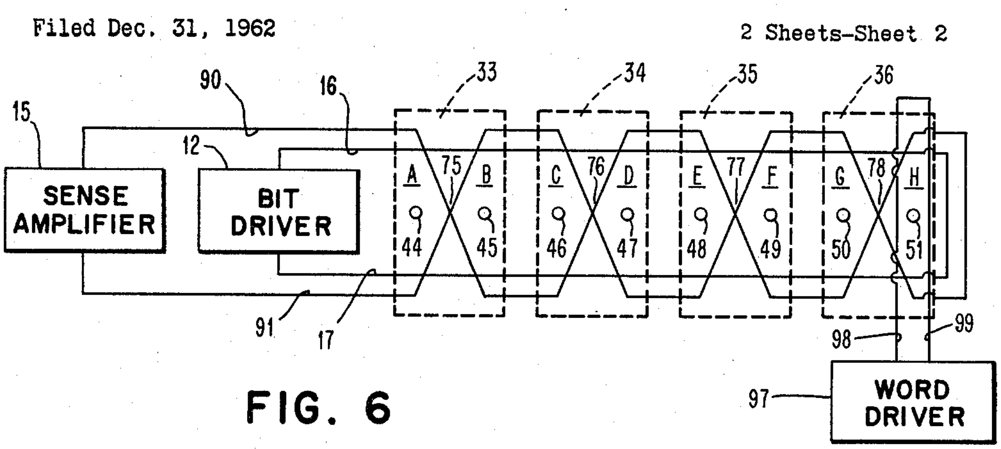
FIGURE 6 is a schematic representation of a preferred sense winding pattern and depicts four circuit boards directly connected to one another.

Arranged transversely to the bit and sense windings is a single-turn coil from the word driver 9. The top portion 18 of the word driver coil is placed over and in juxtaposition to the substrate 26 while the return line 20 is wound beneath the substrate. Both top and lower portions of the coil are connected to the word driver 9. The word drive solenoid lines 18 and 20 are shown in juxtaposition to two magnetized film spots 22 and 24; however, the number of thin film spots per word will vary according to the design of the computer. The bit line 16, 17, may be energized by appropriate circuitry such as a bit line driver 12 (shown in FIGURE 6) and the sense winding terminals 25, 29, are connected to a sense amplifier 15 (FIGURE 6).

Board 81 is divided into two areas by the partition 14. In each area there may be several magnetized thin film spots, and in FIGURE 5 for example, three thin film spots are depicted per each area. The individual areas per circuit board are shown schematically in FIGURE 6 and are lettered from A to H. Four circuit boards 33, 34, 35 and 36 are shown connected together in series and are outlined in dashed lines. The word-driver system, consisting of a word-driver 97 and sense winding 98 and 99, is arranged transversely to the bit and sense line and when the sense line is energized by the word-driver, the magnetic vectors of the thin film spots are rotated from the "easy" to the "hard" axis. It is assumed throughout the following discussion that the inductive coupling action from the bit line to the sense line occurs equally and uniformly in each of the eight areas.

The mathematical equation which explains relationship of the voltage induced into the sense line from the bit line is:

$$E=N\frac{d\phi}{dt}$$

It is further assumed that the voltage induced in the sense line is a perfect square wave. The induced voltage is a square wave since the write voltage on the bit line (i.e., the voltage required to write a "0" or a "1") is ideally a ramp or sawtooth function. Therefore, if the "write" or "re-write" signal is a ramp function, the current and the flux have a similar relationship since these parameters are directly proportional to the voltage. Hence, the differentiation of the flux ($\phi$) with respect to the time $$\left(\frac{d\phi}{dt}\right)$$

produces a resultant square wave. The same analysis it is understood that would apply during the rise time of the "write" or "re-write" pulse would also apply during the fall time thereof. In the remaining paragraphs, whenever the term "write" pulse is used in regard to non-destructive memory, it is assumed that the term "re-write" is equally applicable with respect to a destructive memory system.

The proposed winding of the subject invention, shown schematically in FIGURE 6, depicts the sense winding making a transposition after the first film spot or first area A, and subsequent transpositions are made after every two film spots, that is after every two areas, namely, after C, E and G. The final transposition on the circuit board 36 accommodates only one film spot 51, or one area, namely, H. As can be seen from FIGURE 6, the foregoing arrangement results in the distance between two adjacent transpositions is twice the distance of that between either end transposition to its respective extremity. The induced voltage in the sense line changes polarity every time that there is a transposition. Therefore, the windings are so arranged so that the "in phase" and the "out phase" areas are made equal (that is, the sum total of the positive areas equal the sum total of the negative areas). According to the instant invention there need be only one transposition of the sense winding per circuit board 33, 34, 35, 36 in order to provide adequate reduction of the bit transient. This feature is significant since it is relatively simple to transpose the sense lines by interconnecting the top and bottom overlays during the manufacture of the circuit board as compared with transposing the wires between boards as they are assembled. The circuit boards along a line therefore can be directly connected to one another, as for example, circuit board 33 can be directly connected to board 34.

The first area A is assumed to have a positive pulse induced therein. The voltage induced in area B is negative in view of the fact that there is a physical transposition at 75 in circuit board 33. The reversal of polarity can be explained by considering only the areas A and B with a direct connection across the sense line and between circuit boards 33 and 34. A voltage of positive polarity is induced in both areas by the write signal from bit driver 12 travelling down the bit lines 16, 17. As the voltages are summed around the path, it is seen that the positive voltage of area A is added to the negative voltage induced in area B, the latter voltage being negative because of the transposition at 75.

The voltage induced in area C is the same as that induced in area B and therefore, is negative since there is no physical transposition of the sense winding between areas B and C. The voltage induced in area D is reversed from that of areas B and C and therefore, it is positive because of the transposition at 76 and so on down the line to area H. The eight voltages of opposing polarity can be readily seen in FIGURE 7(*d*) as they are generated during the rise time of the write pulse. The eight square wave voltages are progressively induced (i.e., each voltage is separated by one delay period in each area) as the write pulse travels down the bit line, it being assumed that the velocity of propagation is the same along the bit line. It is also assumed throughout this discussion that the rise time of the write pulse is equal to the delay of the line.

Figure 7:
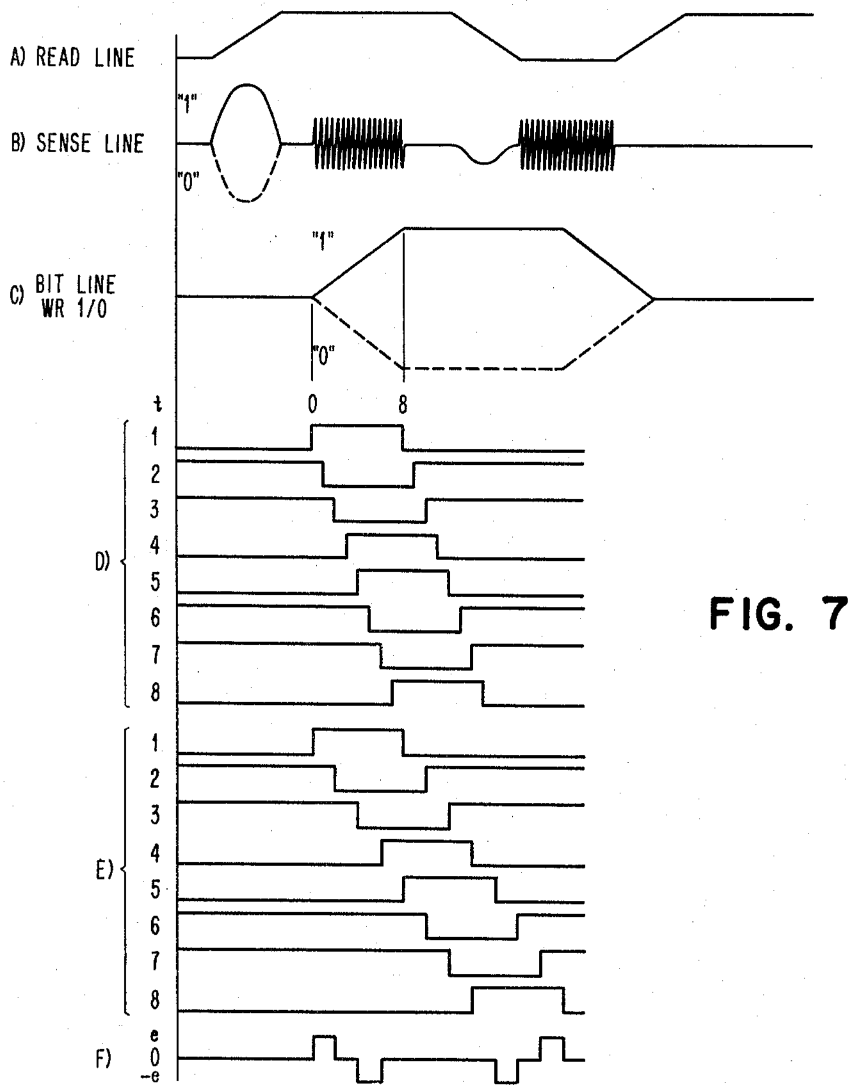
FIGURE 7 shows by means of idealized pulse diagrams how the actual reduction of the transient in the sense line is accomplished according to the instant invention.

By referring to the various sub-drawings of FIGURE 7, it may be seen how cancellation of the transient signal in the sense line is effected according to the embodiment shown in FIGURE 6.

In operation, a read-driver pulse as shown in FIGURE 7(*a*) is applied by word driver 13 to the word driver solenoids 18, 20 (FIGURE 5). The read-driver pulse causes the magnetic vectors of the magnetized thin films comprising a word to be rotated from the "easy" to the "hard" axes. This rotation of the magnetic vectors causes different polarity pulses to be induced in the sense line, the polarity of which determines whether a binary "0" or "1" has been stored in the memory. The different polarity voltages are detected by the sense amplifier 15 (FIGURE 6). One such "read-out" pulse is indicated in FIGURE 7(b), wherein the solid line indicates that a "1" has been read-out of the memory. In a destructive read-out memory system for example the original orientation of the magnetic vectors comprising a word that was read-out of the memory are demagnetized and therefore, the original magnetic vectors of the films must be re-oriented according to their original position. In order therefore to re-orient the magnetic vectors of the thin films, a bit pulse of positive or negative polarity (depending on whether a "1" or "0" is required) is applied by the bit driver 12 to the bit lines 16, 17 (FIGURE 6). One such bit pulse is indicated in FIGURE 7(c).

Since the sense line and the bit line overlays are in juxtaposition as can be seen from FIGURE 5, a voltage is induced in the sense line by the write pulse because of inductive coupling. This transient signal which appears at the beginning and end (i.e., rise time and fall time) of the rewrite pulse is shown in FIGURE 7(b) as a jagged waveform. As can be recognized if FIGURES 7(a) and 7(b) are considered, this transient pulse of FIGURE 7(b) affects the read-driver pulse shown in FIGURE 7(a). The read-driver pulse cannot be properly operated if there is interference because of the amplitude and duration of the transient signal in the sense line. The transient signal and its reduction in amplitude will be considered in greater detail with reference to FIGURES 7(d) to 7(f).

The bit pulse as shown in FIGURE 7(c) travels down the bit line 16, 17 in accordance with the "write" operation of the memory. There is an idealized square-wave voltage as shown in FIGURE 7(d) induced in each of the eight areas (A to H) along the circuit boards as hereinbefore mentioned. Each of the divided areas may have several magnetized positions and therefore, as the write pulse travels down the bit line, a cumulative voltage of positive polarity is developed in each area. The voltages developed by each area may be considered to be a votlage source such as a battery or generator.

In accordance with normal transmission line operation, the induced voltages shown in FIGURE 7(d) do not immediately appear at the output terminals 90, 91, of the sense line (FIGURE 6), but are delayed by transmission time. For example, the voltage induced in area A appears immediately at the output terminals 90, 91, of the sense line since it encounters no delay after being induced therein; similarly, the voltage induced in area B encounters one delay period, whereas the voltage induced in area H encounters a seven delay period. Each of the induced voltages shown in FIGURE 7(d) are shown delayed by an appropriate time preiod in FIGURE 7(e). It can therefore be seen in FIGURE 7(f) that by summing the eight induced voltages that appear at the output terminals 90, 91 of the sense line and which are depicted in FIGURE 7(e), the bit transient is of small amplitude and is effectively cancelled. The idealized pulse shown in FIGURE 7(f) is identical to the jagged pulse depicted in 7(b).

In summary, the instant invention provides that in a destructive or non-destructive memory system, the transient signal induced into the sense line from the write pulse on the bit line can be kept small by transposing the sense winding once per circuit board (i.e., transpositions are made after a first area and subsequent transpositions are made after every two areas, with the last transposition accommodating one area). As a result of the small amplitude of the transient in the sense line it takes less time to dampen the transient and there is less possibility of amplifier saturation. It follows that there is little interference with the read signal in the read line, and hence, fast operating speeds may be attained by a computer employing such a memory device. Furthermore, by the simple manufacturing expedient of transposing the sense line once per circuit board, the substrates may be directly connected to one another.

The embodiments of the invention in which an exclusive property or privilege is claimed are defined as follows:

1. In a memory device comprising:
a substrate means;
a plurality of magnetizable thin film spots plated on the surface of said substrate means, said magnetizable thin film spots being magnetized in either a first or second direction;
magnetizing means capable of magnetizing said thin film spots in either said first or second direction, said magnetizing means being positioned contiguous to said thin film spots and adapted to be connected to an energizing means;
sensing means adapted to be connected to a detector means, said sensing means being transposed through said substrate means at spaced intervals and positioned in juxtaposition to said magnetizing means, whereby when said magnetizing means is energized by said energizing means, the total transient voltage induced in said sensing means is approximately the same amplitude as the individual voltages induced in said sense line at said spaced intervals.

2. A memory device in accordance with claim 1 wherein said sensing means adapted to be connected to a detector means is transposed so that the distance between two adjacent transpositions is approximately equal to the distance of that between either end transposition to the respective extremity of said substrate means.

3. A memory device in accordance with claim 1 wherein said sensing means adapted to be connected to a detector means is transposed so that the distance between two adjacent transpositions is approximately twice the distance of that between either end transposition to the respective extremity of said substrate means.

4. A memory device in accordance with claim 1 wherein said magnetizing means comprises means to magnetize said plurality of thin film spots in either said first or second direction.

5. A memory device in accordance with claim 1, wherein said sensing means comprises a sense winding.

6. In a memory device comprising:
a substrate means;
a plurality of magnetizable thin film spots having an "easy" and "hard" direction of magnetization plated on the surface of said substrate means, said magnetizable thin film spots having magnetization vectors which are magnetized in either a first or second direction along said "easy" direction of magnetization;
magnetizing means capable of magnetizing said thin film spots in either said first or second directions, said magnetizing means being contiguous to said thin film spots and adapted to be connected to a first energizing means;
read-drive means adapted to be connected to a second energizing means and arranged orthogonally to said magnetizing means, said read-drive means adapted to rotate the magnetization vectors of said thin film spots from either said first or second directions along said "easy" toward said "hard" axis of magnetization;
sensing means adapted to be connected to a detector means, said sensing means being transposed through said substrate means at spaced intervals and positioned in juxtaposition to said magnetizing means, whereby when said magnetizing means is energized by said first energizing means after said read-drive means is energized by said second energizing means, the transient voltage induced in said sensing means is substantially of no greater amplitude than the voltage induced in said sense line at said spaced intervals.

7. A memory device in accordance with claim 6 wherein said sensing means adapted to be connected to a detector means is transposed so that the distance between two adjacent transpositions is equal approximately to the distance of that between either end transposition to the respective extremity of said substrate means.

8. A memory device in accordance with claim 6 wherein said sensing means adapted to be connected to a detector means is transposed so that the distance between two adjacent transpositions is twice the distance of that between either end transposition to the respective extremity of said substrate means.

9. In a memory device comprising:
a substrate means having top and bottom surfaces;
a plurality of magnetizable thin film spots formed on the top surface of said substrate means, said magnetizable thin film spots being magnetized in either a first or second direction;
magnetizing means capable of magnetizing said thin film spots in either a first or second direction, said magnetizing means having a forward and return line overlays which are adapted to be connected to an energizing means, said forward line being contiguous to said top surface of said substrate means, and said return line being contiguous to said bottom surface thereof;
a sense winding adapted to be connected to a detector means, said sense winding comprising first and second conductors juxtaposed, respectively, to said top and bottom surfaces of said substrate means, said first conductor being divided at least into two equal intervals to form first and second sections and said second conductor being divided at least into two equal intervals to form first and second sections, said first section of said first conductor and said second section of said second conductor being joined through said substrate means, said second section of said first conductor and said first section of said second conductor being joined through said substrate means, the interconnections provided by said first and second sections of said first conductor with said first and second sections of said second conductor forming a transposition, whereby when said magnetizing means is energized by said energizing means, the induced transient signal which is detected by said sense winding is substantially reduced in amplitude.

10. In a memory device comprising:
a substrate means having top and bottom surfaces;
a plurality of magnetizable thin film spots plated on the surfaces of said substrate means, said magnetizable thin film spots having magnetization vectors which are magnetized in either a first or second direction along an "easy" direction of magnetization;
magnetizing means capable of magnetizing said thin film spots in either said first or second direction, said magnetizing means having a forward and return line overlay which are adapted to be connected to a first energizing means, said forward line being contiguous to said top surface of said substrate means, and said return line being contiguous to said bottom surface thereof;
read-drive means arranged in juxtaposition to said thin film locations as well as being oriented perpendicular to said magnetizing means, said read-drive means adapted to be connected to a second energizing means, said read-drive means being capable of rotating said magnetization vectors of said thin film spots from the "easy" toward the "hard" axis;
a sense winding adapted to be connected to a detector means, said sense winding comprising first and second conductors juxtaposed, respectively, to said top and bottom surfaces of said substrate means, said first conductor being divided at least into two equal intervals to form first and second sections and said second conductor being divided at least into two equal intervals to form first and second sections, said first section of said first conductor and said second section of said second conductor being joined through said substrate means said second section of said first conductor and said first section of said second conductor being joined through said substrate means the interconnections provided by said first and second sections of said first conductor with said first and second sections of said second conductor forming a transposition, whereby when said magnetizing means is energized by said energizing means, the induced transient signal which is detected by said sense winding is substantially reduced in amplitude.

11. A memory device comprising:
at least first and second substrate means;
a plurality of magnetizable thin film spots plated on the surfaces of said first and second substrate means, said magnetizable thin film spots being magnetized in either a first or second direction;
magnetizing means capable of magnetizing said thin film spots in either said first or second direction, said magnetizing means adapted to be connected to an energizing means, and said magnetizing means being positioned contiguous to said thin film spots;
sensing means adapted to be connected to a detector means, said sensing means being transposed only once through each said first and second substrate means, said sensing means being arranged in juxtaposition to said magnetizing means, whereby when said magnetizing means is energized by said energizing means, the induced transient signal which is detected by said sensing means is substantially reduced in amplitude.

12. In a memory device comprising:
at least first and second substrate means;
a plurality of magnetizable thin film spots plated on the surfaces of said first and second substrate means, said magnetizable thin film spots having magnetization vectors which are magnetized in either a first or second direction;
magnetizing means capable of magnetizing said thin film spots in either said first or second direction, said magnetizing means adapted to be connected to a first energizing means, said magnetizing means being positioned continguous to said magnetizable thin film spots;
read-out means adapted to be connected to a second energizing means and arranged orthogonally to said magnetizing means, said read-out means adapted to rotate said magnetization vectors of said thin film spots from either said first or second directions along said "easy" toward said "hard" axis of magnetization;
sensing means adapted to be connected to a detector means, said sensing means being transposed only once through each said substrate means, said sensing means being arranged in juxtaposition to said magnetizing means, whereby when said magnetizing means is energized by said first energizing means after said read-drive is energized by said second energizing means, the transient voltage induced in said sensing means is substantially reduced in amplitude.

13. A memory device in accordance with claim 8 wherein the number of said thin film spots positioned between two adjacent transpositions is approximately double the number of said thin film spots positioned between either end transposition to the extremity of said substrate means.

14. A memory device in accordance with claim 9 wherein said sense winding comprises first and second conductors juxtaposed, respectively, to said top and bottom surfaces of said substrate means, said first conductor being divided into at least first, second and third intervals to form, respectively, first, second and third sections wherein said second interval is twice the distance of each said first and third intervals, said second conductor being divided into at least first, second, and third intervals to form, respectively, first, second and third sections, wherein said second interval is twice the distance of each said first and third intervals, said first and third section of said first conductor being connected to said second section of said second conductor, said first and second section of said second conductor being connected to said second section of said first conductor, said connections between said sections of said first and second conductors forming transpositions, whereby when said magnetizing means is energized by said energizing means, the induced transient signal in said sense winding is no greater than the induced transient signal in each said section.

15. In a memory device comprising: a substrate having front and rear surfaces; a plurality of magnetizable thin film spots plated on said front surface of said substrate; magnetizing means capable of magnetizing said thin film spots in either a first or second direction, said magnetizing means being positioned contiguous to said thin film spots and adapted to be connected to an energizing means; sensing means disposed in close proximity to said thin film spots and inductively coupled to said magnetizing means, said sensing means being transposed through said substrate means such that each section thereof which is inductively coupled to said magnetizing means in close proximity to a number of said thin film spots on said front surface has at least one adjacent integral section thereof inductively coupled to said magnetizing means in close proximity to said rear surface of said substrate.

References Cited by the Examiner

UNITED STATES PATENTS

| | | | |
|---|---|---|---|
| 3,023,402 | 2/62 | Bittmann | 340—174 |
| 3,030,612 | 4/62 | Rubens et al. | 340—174 |

IRVING L. SRAGOW, *Primary Examiner.*